(12) United States Patent
Katayama et al.

(10) Patent No.: US 11,509,800 B2
(45) Date of Patent: Nov. 22, 2022

(54) ON-BOARD CAMERA DEVICE

(71) Applicant: Mitsubishi Electric Corporation, Tokyo (JP)

(72) Inventors: Masahiko Katayama, Tokyo (JP); Nariaki Takehara, Tokyo (JP); Noritaka Kokido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/051,354

(22) PCT Filed: Aug. 30, 2018

(86) PCT No.: PCT/JP2018/032080
§ 371 (c)(1),
(2) Date: Oct. 28, 2020

(87) PCT Pub. No.: WO2020/044484
PCT Pub. Date: Mar. 5, 2020

(65) Prior Publication Data
US 2021/0136269 A1    May 6, 2021

(51) Int. Cl.
*H04N 5/225* (2006.01)
*B60R 11/04* (2006.01)
*B60S 1/56* (2006.01)
*G01K 3/00* (2006.01)
*B60R 11/00* (2006.01)

(52) U.S. Cl.
CPC ......... *H04N 5/22521* (2018.08); *B60R 11/04* (2013.01); *B60S 1/56* (2013.01); *G01K 3/005* (2013.01); *H04N 5/2253* (2013.01); *B60R 2011/0026* (2013.01)

(58) Field of Classification Search
CPC .. H04N 5/22521; H04N 5/2253; B60R 11/04; B60R 2011/0026; B60S 1/56; G01K 3/005

USPC .......................................................... 348/148
See application file for complete search history.

(56) References Cited

U.S. PATENT DOCUMENTS

| | | | |
|---|---|---|---|
| 2016/0052366 A1* | 2/2016 | Hoke | B60H 1/00785 219/203 |
| 2016/0119509 A1* | 4/2016 | Wato | H04N 5/2257 348/148 |
| 2019/0254866 A1* | 8/2019 | Whiteley | A61F 7/007 |

FOREIGN PATENT DOCUMENTS

| | | |
|---|---|---|
| JP | 11-139262 A | 5/1999 |
| JP | 2016-078807 A | 5/2016 |

OTHER PUBLICATIONS

International Search Report for PCT/JP2018/032080 dated Oct. 30, 2018 (PCT/ISA/210).

* cited by examiner

*Primary Examiner* — Joseph G Ustaris
*Assistant Examiner* — Matthew David Kim
(74) *Attorney, Agent, or Firm* — Sughrue Mion, PLLC; Richard C. Turner

(57) ABSTRACT

A thermoelectric element is provided between an on-board camera and a windshield. The on-board camera incorporates a temperature sensor, heat is caused to be transferred from the on-board camera to the windshield when a temperature of the on-board camera is equal to or greater than a threshold, and when the temperature of the on-board camera is lower than the threshold, a space formed by the on-board camera and the windshield is warmed by heat generated by the thermoelectric element itself, whereby condensation on the windshield is restricted.

20 Claims, 6 Drawing Sheets

ON-BOARD CAMERA DEVICE

CROSS REFERENCE TO RELATED APPLICATIONS

This application is a National Stage of International Application No. PCT/JP2018/032080 filed Aug. 30, 2018.

TECHNICAL FIELD

The present application relates to an on-board camera device.

BACKGROUND ART

There is existing technology such that an on-board camera device is installed on an inner side of a vehicle windshield, and a person, a vehicle, or the like existing in front of the vehicle is recognized based on an image captured using the on-board camera device.

As this kind of on-board camera device, technology such that a heat conducting component is provided between an on-board camera and the windshield, whereby cooling of the camera device installed on the inner side of the windshield is promoted and fogging of a portion of the windshield positioned in front of the camera device is restricted, is disclosed in, for example, Patent Literature 1.

According to the on-board camera device disclosed in Patent Literature 1, a heat conducting component is provided between the on-board camera and the windshield, whereby, when an environment outside an own vehicle is at a high temperature (for example, when light is beating down from a blazing sun), heat of the on-board camera is extracted via the heat conducting component by the windshield, which is cooled by receiving a wind accompanying traveling of the own vehicle, because of which cooling of the on-board camera is promoted. Also, when the environment outside the own vehicle is at a low temperature (for example, in winter), a portion of the windshield positioned in front of a lens of the on-board camera fogs easily, but heat of the on-board camera, which is warmed by internal heat generation, is conducted to the windshield via the heat conducting component, the windshield is warmed, and fogging is restricted.

CITATION LIST

Patent Literature

Patent Literature 1: JP-A-2016-78807

SUMMARY OF INVENTION

Technical Problem

However, even when a heat conducting component is provided between an on-board camera and, for example, a windshield, there is a limit to a heat dissipating capacity of the on-board camera with natural air cooling, and a limit also occurs in reducing the size of the on-board camera.

Also, when restricting condensation, the window is warmed by an internal heat generation of the on-board camera, because of which it is necessary for heat generated in the interior of the on-board camera to be transmitted to a housing of the on-board camera, and furthermore, for the heat to be transferred as far as, for example, the windshield via the heat conducting component, and a problem occurs in that time is needed for the windshield to become warm and fogging to be restricted.

Meanwhile, when a heater for restricting condensation is installed separately from the heat conducting component, the time needed until condensation is restricted is shortened, but as both the heat conducting component and the heater need to be installed, there is a problem in that man-hours are required for installation.

The present application discloses technology for resolving the heretofore described kinds of problem, and has an object of providing an on-board camera device such that a reduction in size of an on-board camera is achieved, and installation man-hours can be reduced.

Solution to Problem

An on-board camera device according to the present application is characterized by including an on-board camera including a camera module that captures an ahead image of a vehicle and a control device that executes a recognition process of recognizing a situation in a periphery of the vehicle based on an image captured using the camera module, a bracket that fixes the on-board camera to a window of the vehicle and has an aperture portion through which the on-board camera and the window are opposed in a state wherein the on-board camera is fixed to the window, and a thermoelectric element fixed in contact with both the on-board camera and the window in the aperture portion.

Advantageous Effects of Invention

According to the on-board camera device according to the present application, an on-board camera device such that a reduction in size of an on-board camera is achieved, and installation man-hours can be reduced, can be provided.

DESCRIPTION OF EMBODIMENTS

Figure 1:
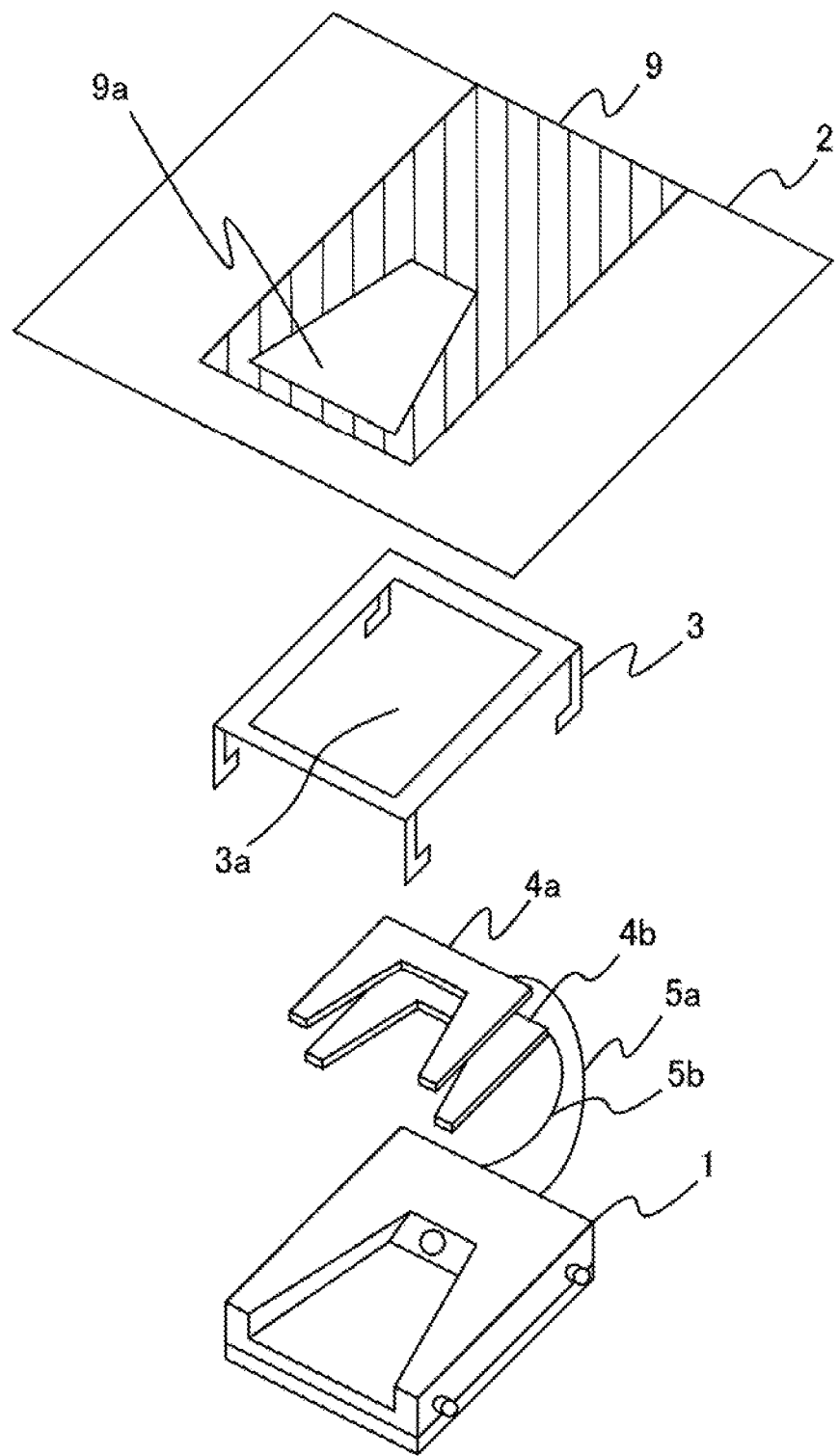
FIG. 1 is an exploded perspective view of an on-board camera device according to a first embodiment.

Hereafter, preferred embodiments of an on-board camera device according to the present application will be described, using the drawings. Identical reference signs in the drawings indicate identical or corresponding portions.

First Embodiment

Figure 2:
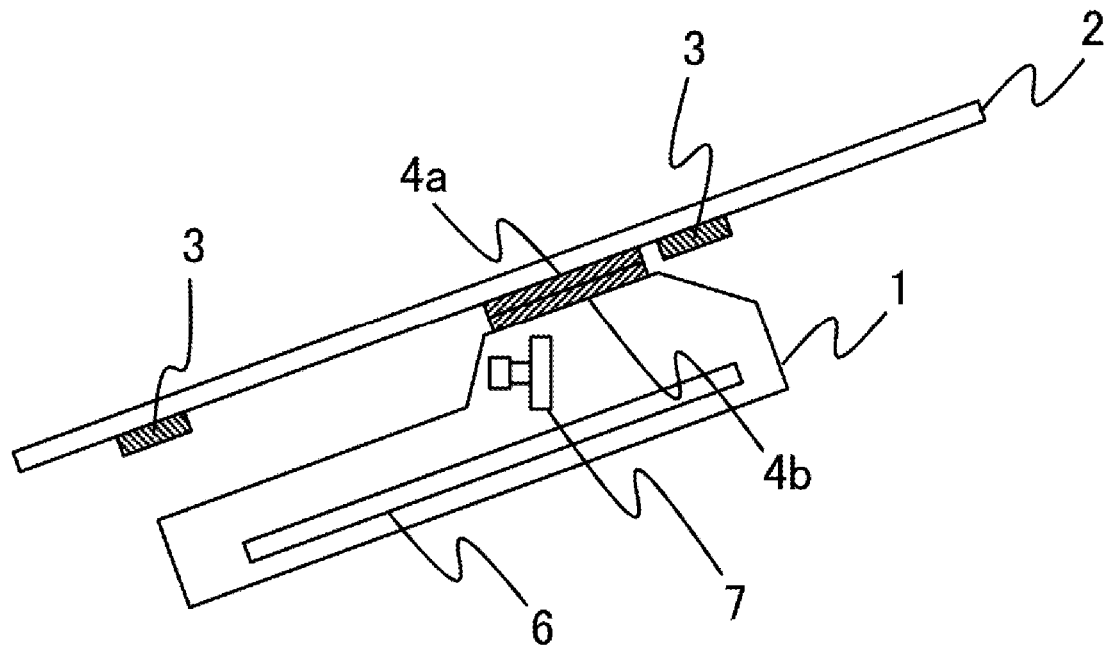
FIG. 2 is a side view of the on-board camera device according to the first embodiment.
Figure 3:
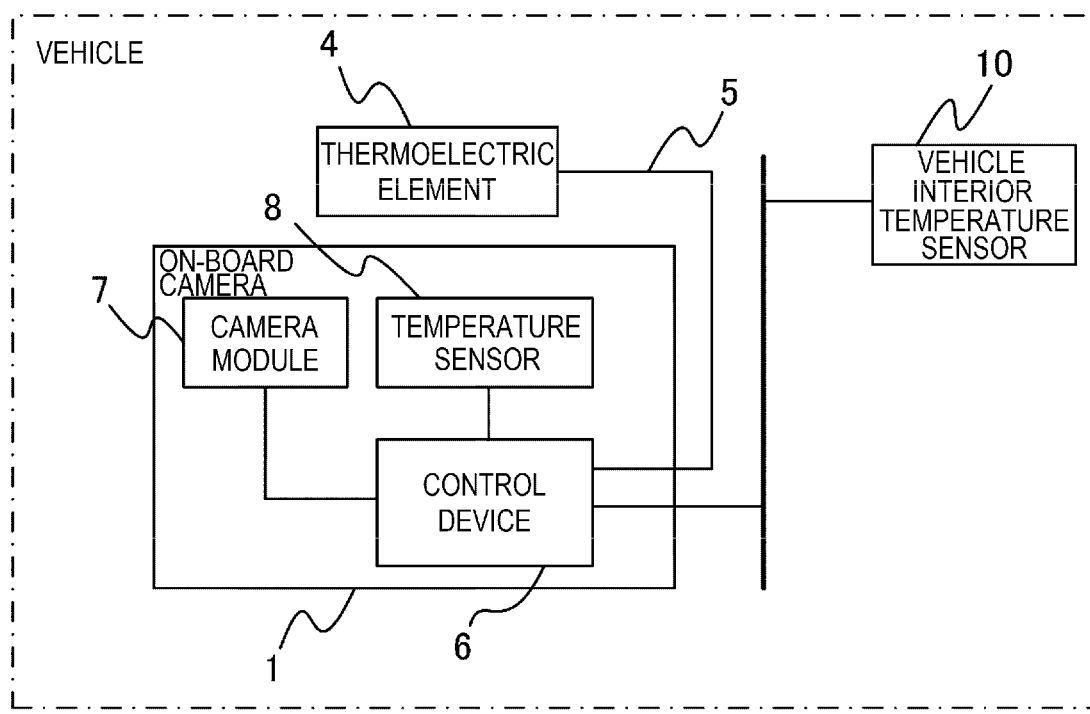
FIG. 3 is a configuration drawing of the on-board camera device according to the first embodiment.

FIG. 1 to FIG. 3 are drawings illustrating a configuration of an on-board camera device according to a first embodiment, wherein FIG. 1 is an exploded perspective view of the on-board camera device, FIG. 2 is a side view of the on-board camera device, and FIG. 3 is a configuration drawing of the on-board camera device.

As shown in FIG. 1 to FIG. 3, the on-board camera device according to the first embodiment is configured of an on-board camera 1, a windshield 2, a bracket 3, a thermoelectric element 4 configured by a first thermoelectric element component 4a and a second thermoelectric element component 4b being stacked one on the other, and an electrical connection line 5 formed of a first electrical connection line 5a and a second electrical connection line 5b connected to the first thermoelectric element component 4a and the second thermoelectric element component 4b respectively.

The on-board camera 1, being attached to an inner side (a vehicle interior side) of the windshield 2 of a vehicle, is attached in a vicinity of an upper center of the windshield 2. A control device 6 provided in an interior of the on-board camera 1 includes a plate-form control circuit substrate that includes a commonly known microcomputer centered on a CPU (central processing unit), a ROM (read-only memory), and a RAM (random access memory). The control device 6 executes a recognition process (a lane departure warning process, a headlight control process, a frontal collision avoidance process, or the like) of recognizing a situation ahead of the vehicle based on an image captured using a camera module 7 that captures an ahead image of the own vehicle, in addition to carrying out a control of the thermoelectric element 4 based on a temperature detected by a temperature sensor 8 provided in the interior of the on-board camera 1. The temperature sensor 8 is mounted on one or both of the control device 6 and the camera module 7.

The bracket 3, the thermoelectric element 4, a heat dissipating component (not shown), and the like are fixed with an adhesive to the windshield 2, and a black ceramic 9 (refer to FIG. 1) is provided in order to restrict visual recognition of the bracket 3, the thermoelectric element 4, the heat dissipating component, and the like from outside the own vehicle. Herein, in order not to impede a field of view of the camera module 7, a trapezoidal missing portion 9a that corresponds to a field angle range of the camera module 7 is formed in the black ceramic 9.

The bracket 3 is a component that fixes the on-board camera 1 to the windshield 2 of the vehicle, and an aperture portion 3a through which the on-board camera 1 and the windshield 2 are opposed in a state wherein the on-board camera 1 is fixed to the windshield 2 via the bracket 3 is formed in the bracket 3. The thermoelectric element 4 is fixed in contact with both the on-board camera 1 and the windshield 2 in the aperture portion 3a.

The thermoelectric element 4 is an element that carries out an exchange of electrical energy and thermal energy, a Peltier element or the like is used, and the thermoelectric element 4 is connected to the windshield 2 and the on-board camera 1 using an adhesive or a heat conducting component. In this embodiment, in order to improve a thermal energy transfer efficiency, the thermoelectric element 4 is of a configuration wherein the first thermoelectric element component 4a and the second thermoelectric element component 4b are stacked one on the other, that is, a configuration wherein a multiple of thermoelectric element components are stacked one on the other, but an advantage is also obtained when the thermoelectric element 4 is configured of one thermoelectric element component.

The electrical connection line 5 is a part that electrically connects the on-board camera 1 and the thermoelectric element 4. Also, a vehicle interior temperature sensor 10 is provided in the vehicle, detects a temperature of the vehicle interior, and notifies the on-board camera 1 of the temperature.

Figure 4:
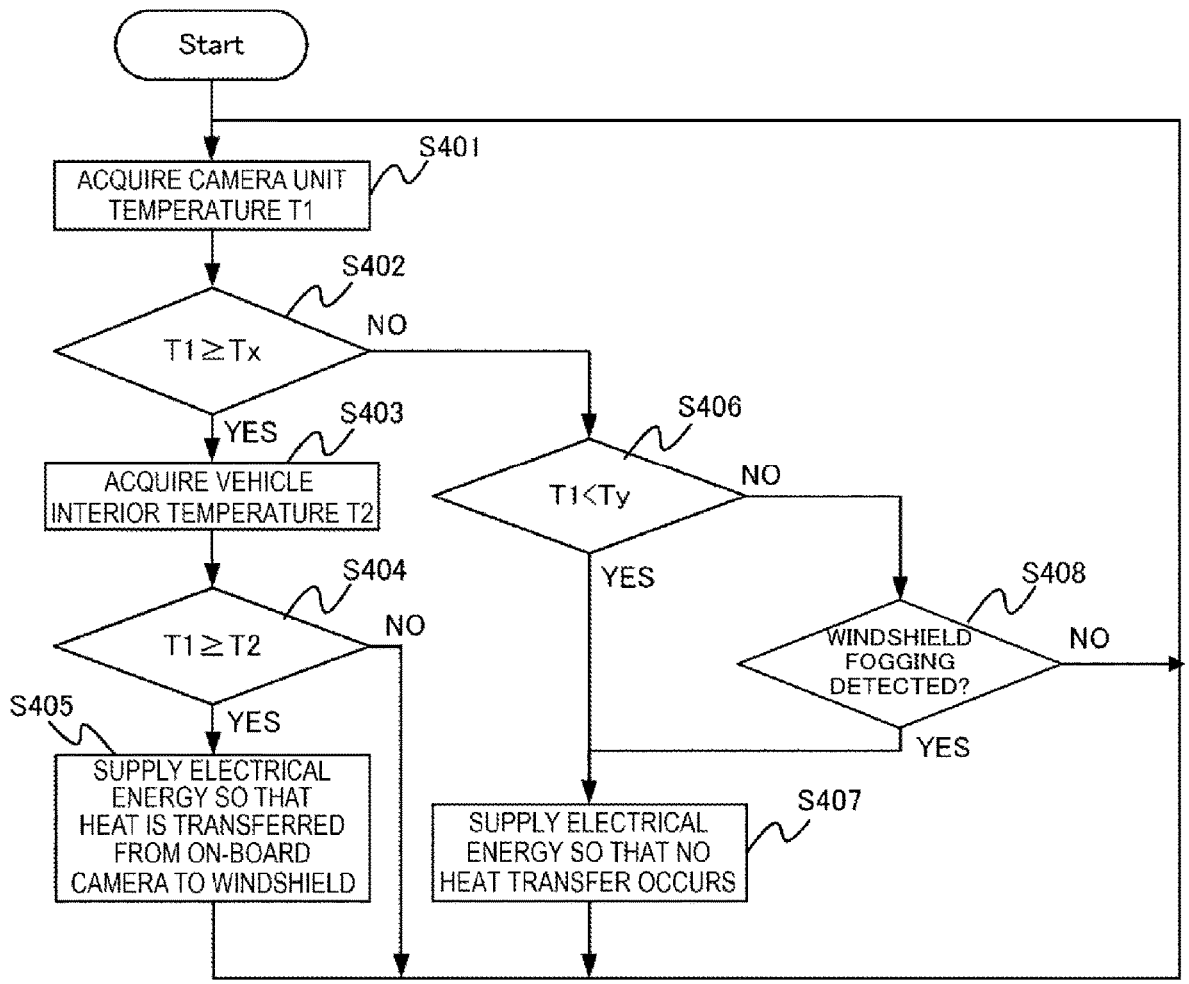
FIG. 4 is a flowchart showing an operation of the on-board camera device according to the first embodiment.

The on-board camera device according to the first embodiment is configured as heretofore described, and next, operations will be described. FIG. 4 is a flowchart showing operations of the on-board camera device according to the first embodiment.

In step S401 of FIG. 4, a temperature T1 of the on-board camera 1 is acquired by the temperature sensor 8, and in step S402, a comparison of the temperature T1 of the on-board camera 1 and a first threshold temperature Tx is carried out. The first threshold temperature Tx is set to be a temperature lower than an allowable temperature of, for example, the control device 6 or the camera module 7.

When the temperature T1 of the on-board camera 1 is equal to or greater than the first threshold temperature Tx in step S402, a vehicle interior temperature T2 is acquired from the vehicle interior temperature sensor 10 in step S403. In step S404, a comparison of the temperature T1 of the on-board camera 1 and the vehicle interior temperature T2 is carried out.

When the temperature T1 of the on-board camera 1 is equal to or greater than the vehicle interior temperature T2 in step S404, electrical energy is supplied to the thermoelectric element 4 so that heat of the on-board camera 1 is transferred to the windshield 2 in order to cool the on-board camera 1. Meanwhile, when the temperature T1 of the on-board camera 1 is lower than the vehicle interior temperature T2 in step S404, the temperature of the on-board camera 1 drops below a peripheral temperature of the on-board camera 1 when heat of the on-board camera 1 is caused to be transferred to the windshield 2 in the thermoelectric element 4, and there is a possibility of condensation forming on the on-board camera 1, because of which the process returns to step S401 without electrical energy being supplied to the thermoelectric element 4.

When the temperature T1 of the on-board camera 1 is lower than the first threshold temperature Tx in step S402, a comparison with a second threshold temperature Ty is carried out in step S406. The second threshold temperature Ty is set to be, for example, a temperature that is lower than the first threshold temperature Tx, and at which condensation forms easily (for example, 10° C., 15° C., or the like, so that operation is carried out in winter).

When the temperature T1 of the on-board camera 1 is lower than the second threshold temperature Ty in step S406, there is a possibility of the windshield 2 fogging, because of which a supply of electrical energy is carried out so that there is no supply of electrical energy in a certain period. By so doing, a space surrounded by the on-board camera 1 and the windshield 2 can be warmed by the self-heating oh thermoelectric element 4, and fogging of a portion of the windshield 2 positioned in front of the on-board camera 1 can be restricted. As a method of arranging so that there is no supply of electrical energy in a certain period, for example, a sinusoidal wave centered on 0V is supplied, or a square wave with a 50% duty cycle centered on 0V may be supplied.

When the temperature T1 of the on-board camera 1 is equal to or greater than the second threshold temperature Ty in step S406, whether or not the windshield 2 in front of the on-board camera 1 is fogged clouded is determined in step S408 based on an image captured using the camera module 7.

When it is determined in step S408 that the windshield 2 is fogged, a supply of electrical energy is carried out in step S407 so that the there is no supply of electrical energy in a certain period, in order that no heat is transferred, and a space surrounded by the on-board camera 1 and the windshield 2 is warmed by the self-heating oh thermoelectric element 4.

When it is determined in step S408 that the windshield in front of the on-board camera 1 is not fogged, the process returns to step S401. As an example, means described in JP-A-11-139262 may be used as means of detecting fogging of the windshield 2, but this not being limiting, other means may be used provided that fogging of the windshield 2 can be detected.

According to the on-board camera device according to the first embodiment, as heretofore described, the on-board camera 1 incorporates the temperature sensor 8, heat is caused to be transferred from the on-board camera 1 to the windshield 2 when the temperature of the on-board camera 1 is equal to or greater than a set temperature, and when the temperature of the on-board camera 1 is lower than the set temperature, a space formed by the on-board camera 1 and the windshield 2 is warmed by the self-heating oh thermoelectric element 4, whereby condensation on the windshield 2 is restricted. Because of this, heat is forcibly transferred, because of which size can be reduced further than in the case of an existing on-board camera. Moreover, as it is sufficient that the thermoelectric element 4 is installed, installation man-hours can be reduced.

Second Embodiment

Figure 5:
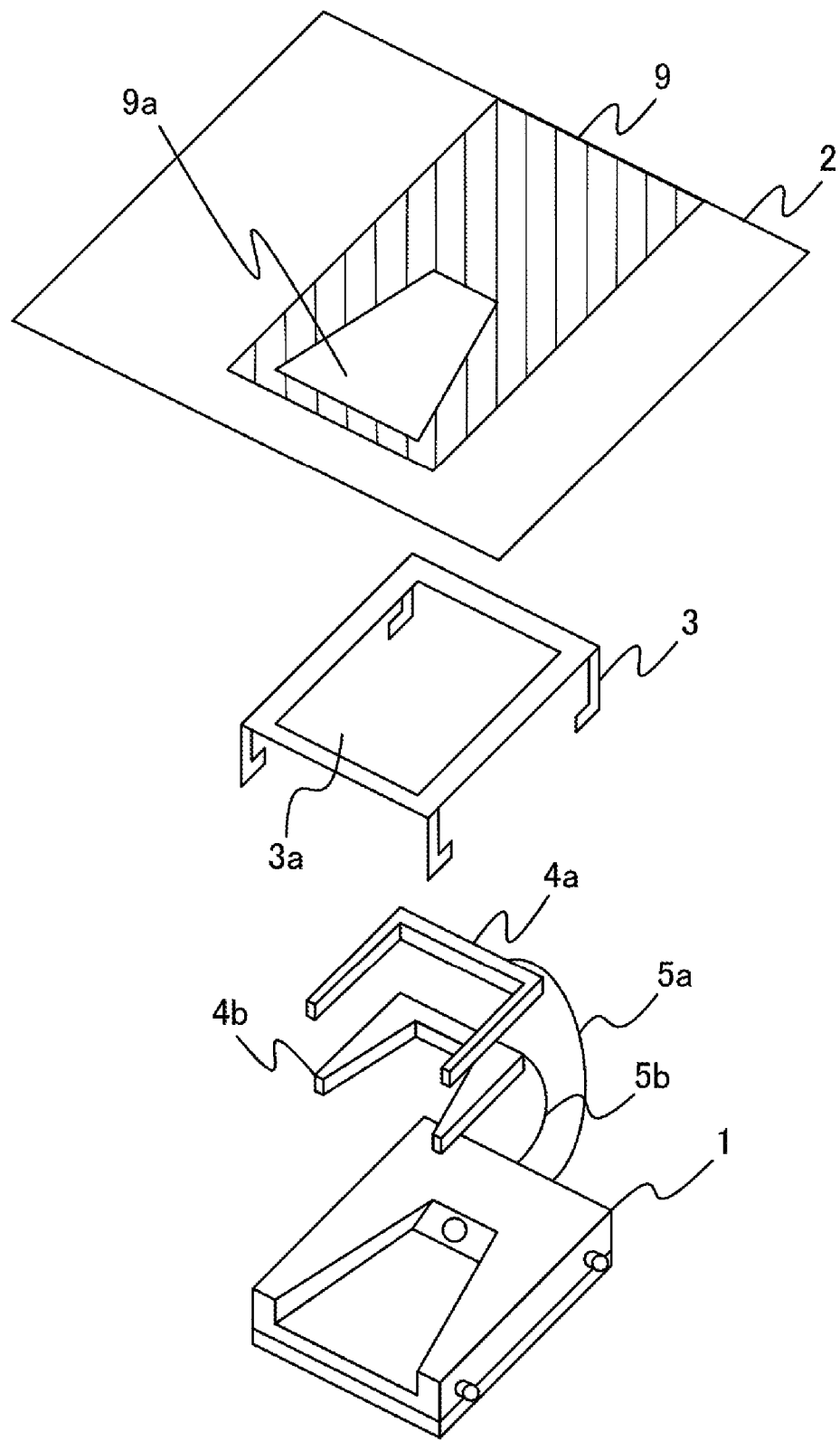
FIG. 5 is an exploded perspective view of an on-board camera device according to a second embodiment.
Figure 6:
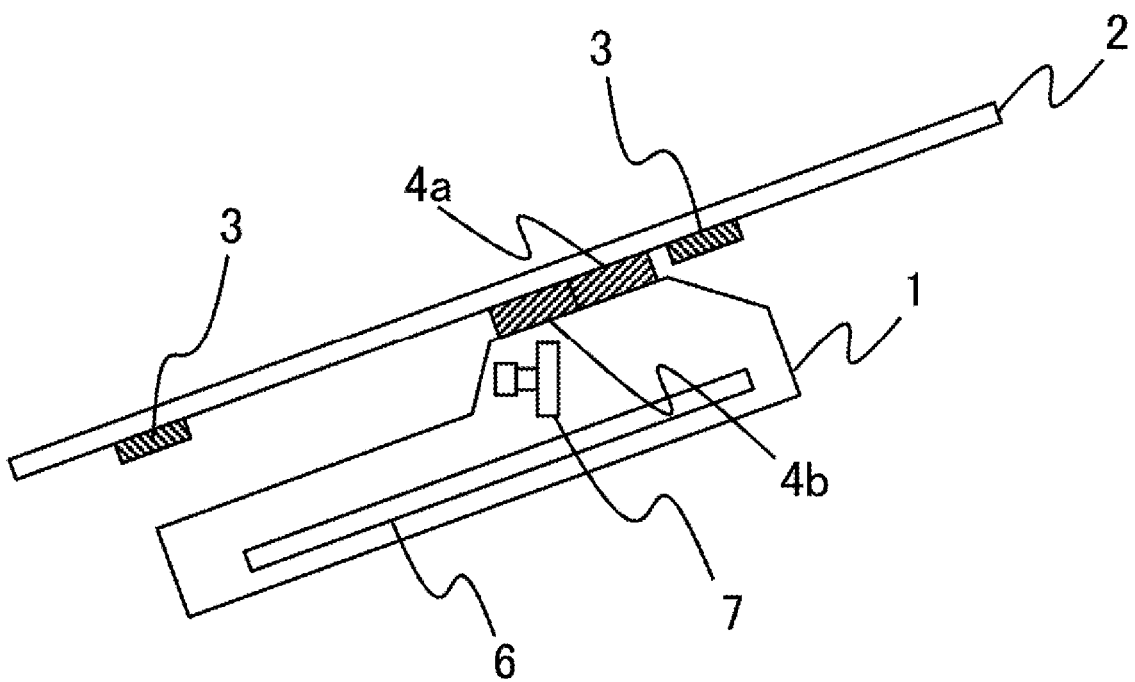
FIG. 6 is a side view of the on-board camera device according to the second embodiment.

Next, an on-board camera device according to a second embodiment of the present application will be described. FIG. 5 is an exploded perspective view of the on-board camera device according to the second embodiment, and FIG. 6 is a side view of the on-board camera device according to the second embodiment.

A difference between the on-board camera device according to the first embodiment and the on-board camera device according to the second embodiment is that while the thermoelectric element 4 is configured by a multiple of thermoelectric elements, those being the first thermoelectric element component 4a and the second thermoelectric element component 4b, being stacked one on the other in the first embodiment, the first thermoelectric element component 4a and the second thermoelectric element component 4b are arranged in parallel between the windshield and the on-board camera 1 in the second embodiment. Further, the first thermoelectric element component 4a is disposed on an outer side of a space surrounded by the on-board camera 1 and the windshield 2, and the second thermoelectric element component 4b is disposed in the space surrounded by the on-board camera 1 and the windshield 2. Each of the first thermoelectric element component 4a and the second thermoelectric element component 4b arranged in parallel may be configured by a multiple of thermoelectric elements being stacked one on the other, as in the case of the thermoelectric element described in the first embodiment. As other configurations are the same as in the first embodiment, identical reference signs are allotted, and a description will be omitted.

Figure 7:
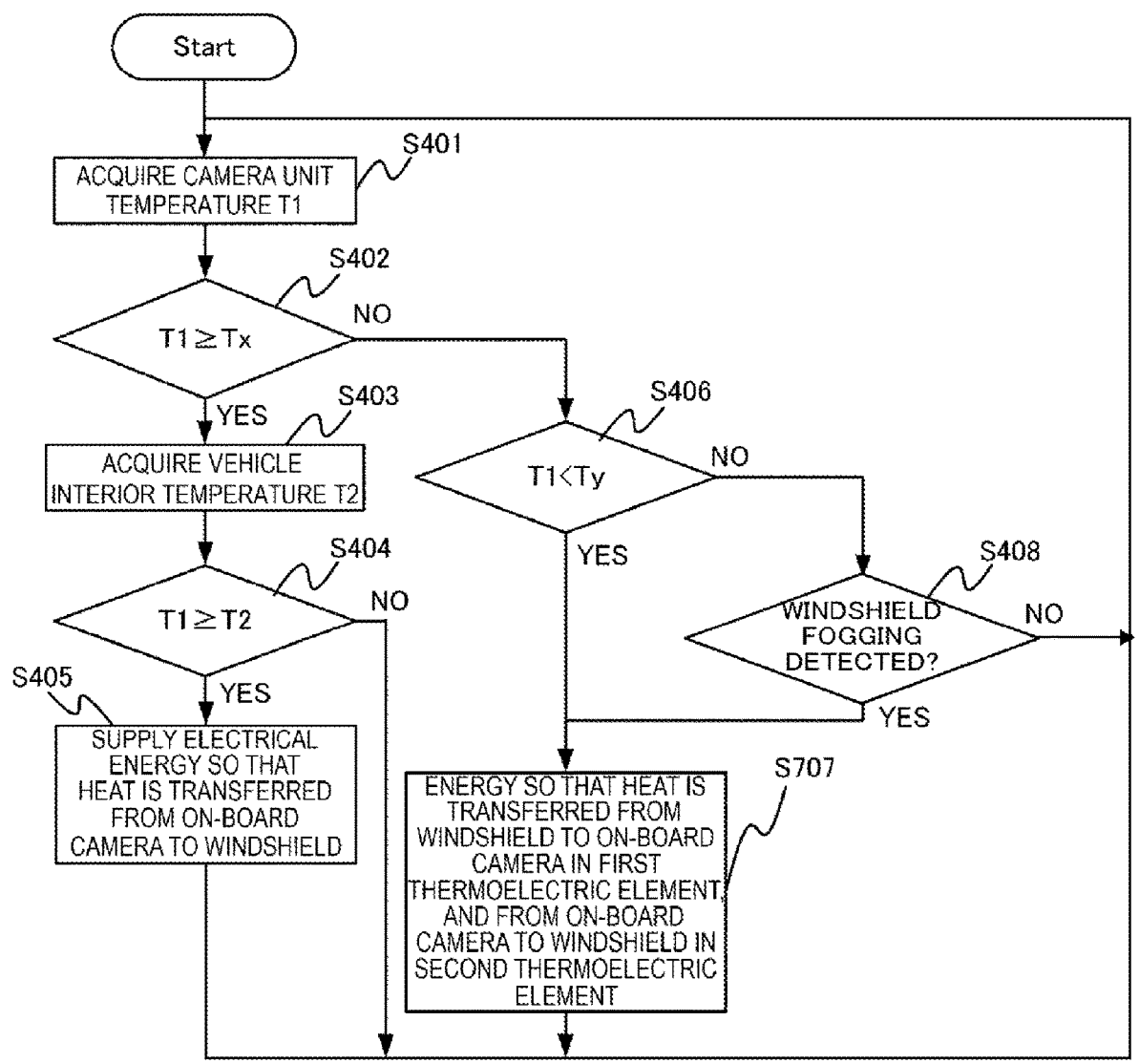
FIG. 7 is a flowchart showing an operation of the on-board camera device according to the second embodiment.

The on-board camera device according to the second embodiment of the present application is configured as heretofore described, and next, operations will be described. FIG. 7 is a flowchart showing operations of the on-board camera device according to the second embodiment.

A difference from the operations of the on-board camera device according to the first embodiment shown in FIG. 4 is an operation of step S707. In step S707, electrical energy is supplied so that heat is transferred from the windshield 2 to the on-board camera 1 in the first thermoelectric element component 4a, and electrical energy is supplied so that heat is transferred from the on-board camera 1 to the windshield 2 in the second thermoelectric element component 4b. The amount of energy supplied is such that the amounts of heat transferred in the first thermoelectric element component 4a and the second thermoelectric element component 4b are equal. By so doing, the windshield 2 in front of the on-board camera 1 is warmed directly by the second thermoelectric element component 4b, in addition to being warmed by heat that the thermoelectric element 4 configured of the first thermoelectric element component 4a and the second thermoelectric element component 4b generates itself, because of which fogging of a portion of the windshield 2 positioned in front of the on-board camera 1 can be more quickly restricted.

According to the on-board camera device according to the second embodiment, as heretofore described, the advantage of restricting condensation on the windshield 2 increases in comparison with the case of the on-board camera device according to the first embodiment.

In each of the heretofore described embodiments, a case wherein the on-board camera 1 is attached to the inner side (the vehicle interior side) of the windshield 2 of a vehicle has been illustrated and described, but the present application not being limited to this, the on-board camera 1 may be attached to, for example, an inner side of a rear window, or the like.

Although the present application is described in terms of various exemplifying embodiments and implementations, the various features, aspects, and functions described in one or a multiple of the embodiments are not limited in their applicability to a particular embodiment, but instead can be applied, alone or in various combinations, to other embodiments.

It is therefore understood that numerous modifications that have not been exemplified can be devised without departing from the scope of the present application. For example, at least one constituent component may be modified, added, or eliminated, and furthermore, at least one constituent component may be extracted and combined with the constituent components of another embodiment.

REFERENCE SIGNS LIST 1 on-board camera, 2 windshield, 3 bracket, 3a aperture portion, 4 thermoelectric element, 4a first thermoelectric element component, 4b second thermoelectric element component, 5 electrical connection line, 5a first electrical connection line, 5b second electrical connection line, 6 control device, 7 camera module, 8 temperature sensor, 9 black ceramic, 9a missing portion, 10 vehicle interior temperature sensor.

The invention claimed is:
1. An on-board camera device, comprising:
an on-board camera including a camera module that is configured to capture an ahead image of a vehicle and a control device, comprising a processor, that is configured to execute a recognition process of recognizing a situation in a periphery of the vehicle based on an image captured using the camera module;
a bracket that fixes the on-board camera to a window of the vehicle and has an aperture portion through which the on-board camera and the window are opposed in a state wherein the on-board camera is fixed to the window; and a thermoelectric element fixed in contact with both the on-board camera and the window in the aperture portion, wherein the thermoelectric element is configured to control transfer of heat between the on-board camera and the window, through the thermoelectric element, based on an amount of electric energy supplied to the thermoelectric element, wherein the thermoelectric element comprises a first thermoelectric element component and a second thermoelectric element component that are both within the aperture portion, and wherein each of the first thermoelectric element component and the second thermoelectric element component is a respective thermoelectric device that is configured to control transfer of heat between the on-board camera and the window.

2. The on-board camera device according to claim 1, wherein the first thermoelectric element component and the second thermoelectric element component are stacked on each other.

3. The on-board camera device according to claim 2, wherein the first thermoelectric element component is disposed on an inner side of the aperture portion with respect to the second thermoelectric element component.

4. The on-board camera device according to claim 2, comprising a temperature sensor that detects a temperature of the on-board camera, wherein
the control device is configured to acquire the temperature of the on-board camera from the temperature sensor, determine whether the acquired temperature of the on-board camera is lower than a first threshold, and control the thermoelectric element based on determining whether the acquired temperature of the on-board camera is lower than the first threshold.

5. The on-board camera device according to claim 4, wherein the control device is configured to cause heat to be transferred from the on-board camera to the window based on the temperature of the on-board camera being determined to be equal to or greater than the first threshold, and control the thermoelectric element so as to restrict an amount of heat transfer that occurs via the thermoelectric element for a certain period based on determining that the temperature of the on-board camera is lower than the first threshold.

6. The on-board camera device according to claim 4, wherein the control device is configured to:
detect fogging of the window based on an image captured by the camera module,
cause, by controlling the amount of electric energy supplied to the thermoelectric element, heat to be transferred from the on-board camera to the window via the thermoelectric element based on determining that the temperature of the on-board camera is equal to or greater than the first threshold, and
control the thermoelectric element so as to restrict an amount heat transfer that occurs for a certain period based on detecting the fogging.

7. The on-board camera device according to claim 4, comprising a vehicle interior temperature sensor that detects an interior temperature of the vehicle, wherein
the control device is configured to acquire the interior temperature of the vehicle from the vehicle interior temperature sensor, and control the thermoelectric element based on the temperature of the on-board camera and the interior temperature of the vehicle.

8. The on-board camera device according to claim 1, wherein the first thermoelectric element component is disposed on an inner side of the aperture portion with respect to the second thermoelectric element component.

9. The on-board camera device according to claim 8, comprising a temperature sensor that detects a temperature of the on-board camera, wherein
the control device is configured to acquire the temperature of the on-board camera from the temperature sensor, determine whether the acquired temperature of the on-board camera is equal to or lower than a first threshold, and control the thermoelectric element based on determining whether the acquired temperature of the on-board camera is lower than the first threshold.

10. The on-board camera device according to claim 9, wherein the control device is configured to cause heat to be transferred from the on-board camera to the window based on the temperature of the on-board camera being determined to be equal to or greater than the first threshold, and control the thermoelectric element so as to restrict an amount of heat transfer that occurs via the thermoelectric element for a certain period based on determining that the temperature of the on-board camera is lower than the first threshold.

11. The on-board camera device according to claim 9, wherein the control device is configured to:
detect fogging of the window based on an image captured by the camera module,
cause, by controlling the amount of electric energy supplied to the thermoelectric element, heat to be transferred from the on-board camera to the window via the thermoelectric element based on determining that the temperature of the on-board camera is equal to or greater than the first threshold, and
control the thermoelectric element so as to restrict an amount heat transfer that occurs for a certain period based on detecting the fogging.

12. The on-board camera device according to claim 9, comprising a vehicle interior temperature sensor that detects an interior temperature of the vehicle, wherein
the control device is configured to acquire the interior temperature of the vehicle from the vehicle interior temperature sensor, and control the thermoelectric element based on the temperature of the on-board camera and the interior temperature of the vehicle.

13. The on-board camera device according to claim 9, wherein the control device is further configured to:
cause heat to be transferred from the on-board camera to the window based on the temperature of the on-board camera being determined to be equal to or greater than the first threshold,
determine whether the temperature of the on-board camera is below a second threshold, lower than the first threshold, based on the temperature of the on-board camera being determined to be less than the first threshold, and
control, based on determining that the temperature of the on-board camera is less than the second threshold, the thermoelectric element such that the first thermoelectric element component transfers heat from the window to the on-board camera while the second thermoelectric element component transfers heat from the on-board camera to the window.

14. The on-board camera device according to claim 1, further comprising a temperature sensor that detects a temperature of the on-board camera, wherein
the control device is configured to acquire the temperature of the on-board camera from the temperature sensor, determine whether the acquired temperature of the on-board camera is lower than a first threshold, and control the thermoelectric element based on determining whether the acquired temperature of the on-board camera is lower than the first threshold.

15. The on-board camera device according to claim 14, wherein the control device is configured to cause heat to be transferred from the on-board camera to the window based on the temperature of the on-board camera being determined to be equal to or greater than the first threshold, and control the thermoelectric element so as to restrict an amount of heat transfer that occurs via the thermoelectric element for a certain period based on determining that the temperature of the on-board camera is lower than the first threshold.

16. The on-board camera device according to claim 14, wherein the control device is configured to:
   detect fogging of the window based on an image captured by the camera module,
   cause, by controlling the amount of electric energy supplied to the thermoelectric element, heat to be transferred from the on-board camera to the window via the thermoelectric element based on determining that the temperature of the on-board camera is equal to or greater than the first threshold, and
   control the thermoelectric element so as to restrict an amount of heat transfer that occurs for a certain period based on detecting the fogging.

17. The on-board camera device according to claim 16, wherein the control device controls, when the fogging is detected, the thermoelectric element so that the total amount of electricity supplied in a certain period becomes close to zero, and causes the thermoelectric element to self-heat to remove the fogging.

18. The on-board camera device according to claim 14, comprising a vehicle interior temperature sensor that detects an interior temperature of the vehicle, wherein
   the control device is configured to acquire the interior temperature of the vehicle from the vehicle interior temperature sensor, and control the thermoelectric element based on the temperature of the on-board camera and the interior temperature of the vehicle.

19. The on-board camera device according to claim 14, wherein the control device is configured to:
   cause heat to be transferred from the on-board camera to the window based on the temperature of the on-board camera being determined to be equal to or greater than the first threshold,
   determine whether the temperature of the on-board camera is below a second threshold, lower than the first threshold, based on the temperature of the on-board camera being determined to be less than the first threshold, and
   control the thermoelectric element so as to restrict an amount of heat transfer that occurs via the thermoelectric element for a certain period based on determining that the temperature of the on-board camera is less than the second threshold.

20. The on-board camera device according to claim 19, wherein the control device is configured to control the thermoelectric element so as to restrict the amount of heat transfer that occurs via the thermoelectric element for the certain period by controlling a supply of the electric energy to the thermoelectric element to have a duty cycle with both a period of supply and no supply of the electric energy.

* * * * *